3,641,111
PROCESS FOR DIRECT ESTERIFICATION OF TEREPHTHALIC ACID WITH AN ALKYLENE GLYCOL
Stanley D. Lazarus, Petersburg, Pa., assignor to Allied Chemical Corporation, New York, N.Y.
No Drawing. Filed Jan. 31, 1969, Ser. No. 795,742
Int. Cl. C07c 69/82
U.S. Cl. 260—475 P                              19 Claims

ABSTRACT OF THE DISCLOSURE

Direct esterification of terephthalic acid and an alkylene glycol is expedited by forming a fine dispersion of the ingredients aided by a dispersing and wetting agent. The esterification reaction can be carried out in the presence of a small quantity of a solvent which causes successive quantities of acid to enter the liquid phase and to react to form molten esters which then increase the total quantity of liquid phase present in the mixture. This process enables the esterification reaction to be carried out practically at atmospheric pressure or to be carried out at super atmospheric pressure in a shorter time span than is the case in esterification processes heretofore available.

BACKGROUND OF THE INVENTION

This invention relates to an improved process for the manufacture of alkylene glycol esters of terephthalic acids, or mixtures of terephthalic with minor quantities of other dibasic acids such as isophthalic, 2,6 naphthalene dicarboxylic acid, sebacic acid, and the like. More particularly, it relates to an improved process for the manufacture of linear, high molecular weight polyalkylene terephthalates and copolymers thereof through direct esterification of alkylene glycol and terephthalic acid or its mixtures with minor quantities of other dibasic organic acids wherein the acid and the alkylene glycol are formed into a fine dispersion and wherein a dispersing and wetting agent is added to promote rapid adsorption and penetration of the alkylene glycol onto and into the terephthalic acid and further wherein a solvent can be added to promote dissolution of the terephthalic acid during the esterification.

Many methods are known for the manufacture of glycol esters from terephthalic acid. One of the more promising methods from the standpoint of ease of operation as well as lower cost of operation is the so-called direct esterification method. This method was initially disclosed in U.S. 2,465,319; however, it received little attention as a commercial alternative as it proceeds quite slowly (approximately 72 hours required at atmospheric pressure) as well as it permits formation of large amounts of aliphatic ether groups which causes the resulting polymer to have poor light and thermal stability as well as other undesirable properties. The specific control of the amount of ether groups in the final polymer is mandatory when the polymer is to be used for fiber or film products.

U.S. Pats. 3,024,220; 3,050,533 and 3,050,548 illustrate preparing glycol esters from terephthalic acid by the direct esterification method wherein the process is carried out in a much shorter period of time by utilizing special super-atmospheric pressure conditions and in the former and latter patents maintaining the reaction conditions in an alkaline condition wherein the simultaneous ether group formation in the polymer is discouraged. The use of super-atmospheric conditions presents a much less economical method not only from the initial capitalization considerations wherein all equipment must of necessity be manufactured to specifications to sustain high pressure processing conditions, but the processing conditions themselves also presenting a continuing less economical method than a method that operates at atmospheric conditions. The need for special precautions also tends to make high pressure processes less desirable than atmospheric or low pressure processes. Needless to say, a direct esterification process for preparing glycol esters from terephthalic acids and alkylene glycols at atmospheric pressure within substantially an equivalent period of time would make a substantial contribution to this art.

SUMMARY OF THE INVENTION

It is, therefore, a primary object of this invention to provide a new and novel process for the manufacture of fiber and film forming polyalkylene terephthalate directly from alkylene glycol and terephthalic acid.

Another object of this invention is to provide a new and novel process for the manufacture of fiber and film forming polyalkylene terephthalate directly from the alkylene glycol and terephthalic acid wherein the reactants are reacted in the presence of specific additives at atmospheric pressure and wherein the polyalkylene terephthalate is prepared within a substantially shorter period of time than heretofore possible in a low pressure process.

Another object of this invention is to provide a super atmospheric pressure esterification process in which less time is required to complete the reaction than in the case with superatmospheric esterification processes presently available.

These and other objects will become apparent in the course of the following specifications and claims.

In accordance with the present invention, a fiber forming polyalkylene terephthalate is prepared by direct esterification of terephthalic acid with an alkylene glycol containing 2 to about 10 carbon atoms per molecule under direct esterification conditions wherein the terephthalic acid or its mixtures with minor quantities of other organic dibasic acids and the alkylene glycol are formed into a fine dispersion to increase the surface area of the terephthalic acid in contact with the alkylene glycol, and wherein the glycol and acid are reacted in the presence of a dispersing and wetting agent to promote rapid adsorption and penetration of the alkylene glycol onto and into the terephthalic acid, and further wherein the glycol and acid are reacted in the presence of a solvent to promote dissolution of the terephthalic acid during the esterification. The dispersing and wetting agent is selected from the group consisting of tetrasodium pyrophosphate, sodium hexametaphosphate, poly (vinyl pyrrolidone), sodium stearate, sodium oleate, triethanolamine, octadecylamine, p-(t-octyl) phenol, sodium heptadecyl sulfate, sodium-p-(t-octyl) benzene sulfonate, tetrabutyl phosphonium chloride, polyethylene glycol and trimethyl lauryl ammonium iodide. The solvent is selected from the group consisting of dimethyl formamide, dimethyl acetamide, dimethyl sulfoxide, N-methyl pyrrolidone, caprolactam, dimethyl sulfone, γ-valerolactam, xylene, diphenyl-diphenyl oxide, monochlorobenzene, p-dichlorobenzene, and dichloroethyl ether. Subsequent condensation of the diglycol terephthalate ester and low polymers thereof to polyalkylene terephthalate is conducted in the presence of suitable polycondensation catalysts. Other acids and ester-forming derivatives thereof useful in the present invention are isophthalic acid, sebacic acid, adipic acid, p-carboxyphenoacetic, succinic acid, oxalic acid, glutaric acid, pimelic acid, suberic acid, and azelaic acid although terephthalic acid is preferred.

The polyalkylene terephthalate polymers may be prepared by esterifying terephthalic acid or its mixtures, etc., with one or more alkylene glycols having 2 to about 10 carbon atoms per molecule. More preferred, however, are the lower molecular weight alkylene glycols which contain 2 to about 4 carbon atoms since they produce highly polymerized esters having high melting points. Suitable alkylene glycols include, ethylene glycol, propylene glycol, butylene glycol, trimethylene glycol, tetramethylene glycol, hexamethylene glycol, heptamethylene glycol, decamethylene glycol, 1,4-cyclohexane dimethanol, 1,3-cyclobutane dimethanol and mixtures thereof with ethylene glycol being preferred.

In directly esterifying the terephthalic acid, the alkylene glycol is present during the direct esterification in amounts ranging from about 1 to 6, preferably about 1.3 to 3, moles of alkylene glycol per mole of terephthalic acid. The direct esterification of the alkylene glycol and the terephthalic acid may start as low as about 200° C. and range up to about 300° C. either at atmospheric pressure or at pressures ranging up to about 300 p.s.i.g., but more preferably at atmospheric pressure for periods of from about 1 to about 20 hours until the reaction is substantially completed. The actual reaction times will vary depending upon the degree of dispersion, solvent concentration, reaction pressure, temperature and the desired molecular weight of the final polymer.

The polymerization or condensation of the diglycol terephthalate ester prepolymer is then carried out at temperatures ranging from about 260° C. to about 290° C., under reduced pressure which can be as low as 0.1 torr. The condensation is carried out under these conditions for periods ranging from about 1 to about 10 hours and preferably about 2 to 8 hours until a polymerization product of the requisite molecular weight, as determined by viscosity or other convenient physical measurement is obtained. The duration of the condensation depends upon the predetermined polymerization conditions, such as, catalyst concentration, batch or continuous process, surface generation provisions, pressure and temperature profiles. The polymerization mass, in a continuous polymerization process, can be agitated continuously to give maximum exposure to the vacuum which assists in rapidly removing the glycol. The condensation polymerization is preferably carried out in an inert atmosphere and under subatmospheric pressures.

The direct esterifications may be carried out in the presence of various additives to control the characteristics of the final polymer as desired for specific end uses. Such additives can be ortho- or meta-isomers or phthalic acid as well as various modified phthalic acids, such as sulfonated isomers of phthalic acid, and other compounds, such as 2,5-naphthalene dicarboxylic acid, 4,4'-dicarboxydiphenyl sulfone, diphenylene phenylene diamine, and tricresyl phosphate. The diphenylene phenylene diamine is added, for example, when preparing a polymer to be converted into a tire yarn where fatigue resistance is desirable. These as well as other additives may be utilized to control such characteristics of the final polymer as luster, flammability, static dissipation, heat and light stability, adhesion, dye uptake and the like. Typical additives are dyestuff precursors and assistants, pigments, non-reactive and heterogeneous polymers, fluorescent agents and brighteners, bacteriostats, cross-linking agents and the like.

In preparing the linear, high molecular weight polyalkylene terephthalate contemplated by the invention, it is desirable to use a very fine dispersion of the terephthalic acid in the alkylene glycol, preferably ethylene glycol. The type of reaction mixture required is obtained with the aid of a dispersing and wetting agent in amounts ranging from about 0.05 to about 1.5, preferably about 0.1 to about 1.0, weight percent based on the weight of the terephthalic acid used in the direct esterification mixture, and a solvent in amounts ranging from about 0.05 to about 10.0, preferably about 1.0 to about 5.0 weight percent based on the weight of the terephthalic acid used in the direct esterification reaction. The solvent is added in small concentrations and never at such a percentage of the entire mixture to cause complete solution. Typical dispersing equipment may be advantageously used to prepare these dispersions such as colloid mills, sand mills, high shear mixers, and various kneaders and blendors, and the like.

The presence of the dispersing and wetting agent promotes rapid adsorption and penetration of the alkylene glycol onto and into the terephthalic acid and the solvent is added to promote quick solution of the terephthalic acid and acid terminated oligomers during the estification. Although this invention is operable with just the dispersing and wetting agent present, the most preferred mode of the invention is also to utilize the solvent to even further enhance the reaction.

Example 1 depicts a control run wherein the direct esterification reaction is carried out in accordance with the teachings of the prior art wherein a period of 72 hours is required to complete the reaction which is carried out at atmospheric pressure.

Example 2 illustrates one method in accordance with the teachings of this invention wherein the direct esterification reaction is carried out within a time period of approximately 9 to 10 hours which is dramatically shorter than heretofore possible and wherein the reaction is carried out at atmospheric pressure.

Example 3 shows one method wherein the direct esterification can also be carried out at superatmospheric pressure, even though the preferred method is carried out at atmospheric pressure for the reasons hereinbefore related.

Example 4 teaches one method wherein the direct esterification can be carried out with just the dispersing and wetting agent present.

PREFERRED EMBODIMENTS

The following examples illustrate the practice and principles of this invention and a mode of carrying out the invention.

EXAMPLE 1

Control run—166 grams (1 mole) of purified terephthalic acid, 124 grams (2 moles) of fiber grade ethylene glycol, and 0.0125 gram (0.0005 mole) of solid NaOH were charged to a 3 necked flask. The flask was equipped with an electrically heated jacket. A thermometer was inserted through one neck, a nitrogen sparge capillary tube through the second and a steam heated Liebig condenser through the third neck. At the top of the steam heated condenser was an adaptor leading downward to a water cooled Liebig condenser which was attached to a graduated collection cylinder. The ingredients were heated to about 200° C. and refluxing of ethylene glycol was established. Nitrogen bubbles were sparged through the reactants to ensure mixing. The reaction mixture was opaque and did not become transparent until refluxing had been continued for 72 hours. After this time 20 ml. of water had been collected in the graduated collection cylinder. This indicates that esterification was 56% complete since complete reaction would generate 2 moles (36 grams) of water.

EXAMPLE 2

166 grams (1 mole) of purified terephthalic acid and 124 grams (2 moles) of ethylene glycol were charged to a Waring Blendor along with 0.415 gram of tetrasodium pyrophosphate ($Na_4P_2O_7 \cdot 10H_2O$), 0.22 gram of zinc acetate dihydrate and 1 ml. of N,N dimethyl formamide. The ingredients were blended at low speed for 15 minutes. The resultant finely dispersed smooth paste was easily poured into the 3-necked flask described in Example 1. Reaction commenced after a 1 hour induction period and it was noted that a clear transparent solution was present in the reaction flask after 8 hours of reflux at atmospheric pressure. At this time 28 ml. of water had been collected in the graduated collection cylinder. Analysis of this pre-polymer was as follows:

Reduced viscosity in o-chlorophenol at 0.5 g./100 ml. concentration was 0.08.

Carboxyl end group concentration=96 eq./$10^6$ grams.
Hydroxyl end group concentration=3,460 eq./$10^6$ grams.

Fifty grams of this pre-polymer were further polymerized after adding 0.015 gram of $Sb_2O_3$ and 0.06 gram of triphenyl phosphate. Polymerization was effected by immersing the glass flask of a rotating vacuum drier in a salt bath maintained at 290° C. for 4 hours while a vacuum of 0.1 torr was maintained. The resultant polymer was hard, white and opaque. It has a reduced o-chlorophenol viscosity of 0.62 and a melting point of 254° C. measured by differential thermal analysis.

EXAMPLE 3

166 grams (1 mole) of terephthalic acid, 124 grams (2 moles) of ethylene glycol, 0.1225 gram (0.0005 mole) of manganous acetate tetrahydrate, 1.66 grams of sodium p-dodecyl benzene sulfonate, and 5 ml. of dimethyl sulfoxide were charged to a Waring Blendor and agitated for 30 minutes on low speed.

The resultant finely dispersed smooth paste was poured into a 2000 ml. stainless steel reactor which was fitted with a pressure gauge, nitrogen inlet, thermowell, and automatic pressure release valve set at 35 p.s.i.g. The reactor was heated by means of an electrically heated mantle. A temperature controller was used in conjunction with a thermocouple inserted between the outer wall of the reactor and the heating mantle. The temperature was controlled at 240° C. at the reactor wall while the internal temperature started at 230° C. and finished at 240° C. when the reaction was completed as indicated by completion of pressure building (i.e., no further pressure release from the automatic valve). The time for completion of the reaction was 3 hrs., 15 min. while the time for a control run without preparation of such a dispersion was 4 hours. When the reaction was completed, the jacket was dropped, the reactor head removed, and the plug of pre-polymer was recovered. This pre-polymer had a reduced viscosity of 0.07, 208 equivalents of COOH and 1944 equivalents of OH per $10^6$ grams.

Fifty grams of this polymer were further polymerized in a "Rinco" rotary vacuum drying apparatus after adding 0.015 g. $Sb_2O_3$ and 0.06 gram of tris (nonyl phenyl) phosphite. A slightly greenish opaque polymer was obtained which had a reduced o-chlorophenyl viscosity of 0.70 with 23 equivalents of COOH and 52 equivalents of OH per $10^6$ grams of polymer. The differential thermal analysis melting point was 254° C.

EXAMPLE 4

166 grams (1 mole) of purified terephthalic acid and 124 grams (2 moles) of fiber grade ethylene glycol were charged to a Waring Blendor along with 1.66 grams of polyvinyl pyrrolidone and 0.22 gram of zinc acetate dihydrate. The mixture was dispersed at low speed for 15 minutes after which the finely dispersed smooth paste was poured into the flask and connected to the apparatus described in Example 1. After refluxing of glycol was established at atmospheric pressure, an induction period of 3 hours occurred before condensate began to drip into the graduated cylinder collector. The reaction was continued for 20 hours until the contents of the flask became transparent. At this time 22 ml. of water distillate had been collected. The product had a reduced o-chlorophenol viscosity of 0.12, carboxyl end groups of 240 equivalents per $10^6$ grams, and hydroxyl end groups of 2214 equivalents/$10^6$ grams.

Fifty grams of this polymer were further polymerized as in Example 2. The hard, white polymer had a reduced o-chlorophenol viscosity of 0.54 and melted at 252° C., determined by differential thermal analysis at a heating rate of 4 degrees centigrade per minute.

What is claimed is:

1. A process for the direct esterification of terephthalic acid with an alkylene glycol which comprises esterifying terephthalic acid with an alkylene glycol containing 2 to about 10 carbon atoms per molecule under direct esterification conditions wherein the terephthalic acid is in the form of a fine dispersion to increase surface area in contact with the alkylene glycol, and wherein the glycol and acid are reacted in the presence of from about 0.05 to about 1.5 weight percent based on the weight of the terephthalic acid of material selected from the group consisting of tetrasodium pyrophosphate, sodium hexametaphosphate, sodium stearate, sodium oleate, triethanolamine, octadecylamine, sodium heptadecyl sulfate, polyvinyl pyrrolidone, p-(t-octyl) phenol, sodium-p-(t-octyl) benzene sulfonate, tetrabutyl phosphonium chloride, polyethylene glycol and trimethyl lauryl ammonium iodide to promote rapid adsorption and penetration of the alkylene glycol onto and into the terephthalic acid.

2. The process of claim 1 wherein the direct esterification is conducted at temperatures ranging from about 200° C. to about 300° C. and pressures ranging from atmospheric up to about 300 p.s.i.g.

3. The process of claim 1 wherein the material is tetrasodium pyrophosphate.

4. The process of claim 1 wherein the alkylene glycol is ethylene glycol.

5. The process of claim 1 wherein the direct esterification is carried out at atmospheric pressure.

6. The process of claim 1 wherein the direct esterification is carried out at 70 p.s.i.g.

7. A process for the direct esterification of terephthalic acid with an alkylene glycol which comprises esterifying terephthalic acid with an alkylene glycol containing 2 to about 10 carbon atoms per molecule under direct esterification conditions wherein the terephthalic acid is in the form of a fine dispersion to increase surface area in contact with the alkylene glycol, and wherein the glycol and acid are reacted in the presence of from about 0.05 to about 1.5 weight percent based on the weight of the terephthalic acid of material selected from the group consisting of tetrasodium pyrophosphate, sodium hexametaphosphate, sodium stearate, sodium oleate, triethanolamine, octadecylamine, sodium heptadecyl sulfate, polyvinyl pyrrolidone, p-(t-octyl) phenol, sodium-p-(t-octyl) benzene sulfonate, tetrabutyl phosphonium chloride, polyethylene glycol and trimethyl lauryl ammonium iodide to promote rapid adsorption and penetration of the alkylene glycol onto and into the terephthalic acid and further wherein the glycol and acid are reacted in the presence of from about 0.05 to about 10.0 weight percent based on the weight of the terephthalic acid of a second material selected from the group consisting of dimethyl formamide, dimethyl acetamide, dimethyl sulfoxide, N-methyl pyrrolidone, caprolactam, dimethyl sulfone, γ-valerolactam, xylene, diphenyl-diphenyl oxide, monochlorobenzene, p-dichlorobenzene, and dichloroethyl ether to promote dissolution of the terephthalic acid during the esterification.

8. The process of claim 7 wherein the direct esterification is conducted at temperatures ranging from about 200° C. to about 300° C. and pressures ranging from atmospheric up to about 300 p.s.i.g.

9. The process of claim 7 wherein the material is tetrasodium pyrophosphate.

10. The process of claim 7 wherein the second material is dimethyl formamide.

11. The process of claim 7 wherein the second material must boil at above 100° C., atmospheric pressure.

12. The process of claim 7 wherein the second material is present in an amount less than 10% by weight of the mixture.

13. The process of claim 7 wherein the alkylene glycol is ethylene glycol.

14. The process of claim 7 wherein the material is tetrasodium pyrophosphate and the second material is dimethyl formamide.

15. The process of claim 7 wherein the second material is dimethyl acetamide.

16. The process of claim 7 wherein the second material is dimethyl sulfoxide.

17. The process of claim 7 wherein the material is sodium hexametaphosphate and the second material is dimethyl formamide.

18. The process of claim 7 wherein the direct esterification is carried out at atmospheric pressure.

19. The process of claim 7 wherein the direct esterification is carried out at 70 p.s.i.g.

References Cited

UNITED STATES PATENTS

| | | | |
|---|---|---|---|
| 3,023,183 | 2/1962 | Nelson | 260—475 P |
| 3,497,473 | 2/1970 | Kemkes | 260—475 P |

FOREIGN PATENTS

| | | | |
|---|---|---|---|
| 977,426 | 12/1964 | Great Britain | 260—475 P |
| 1,060,214 | 3/1967 | Great Britain | 260—475 P |

LORRAINE A. WEINBERGER, Primary Examiner

E. J. SKELLY, Assistant Examiner

U.S. Cl. X.R.

260—75 M, 485 G